(No Model.)
D. F. SPANGLER.
SPADING MACHINE.
No. 293,104. Patented Feb. 5, 1884.
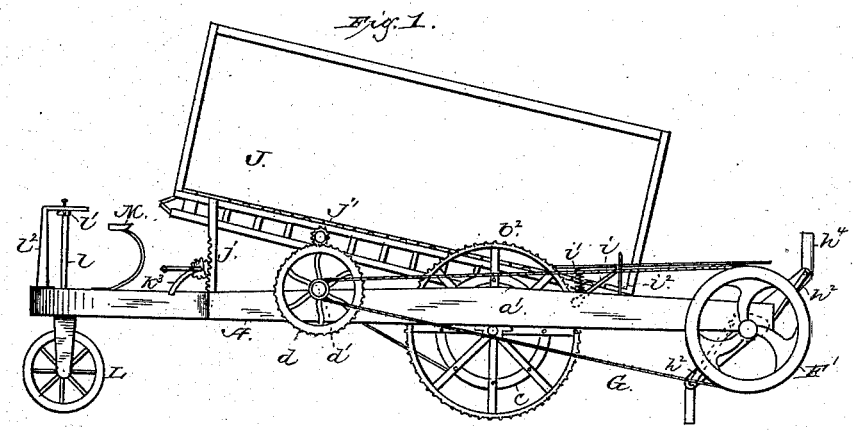
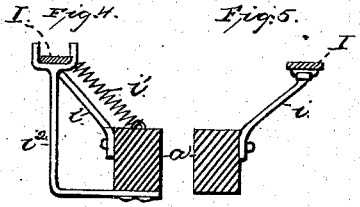
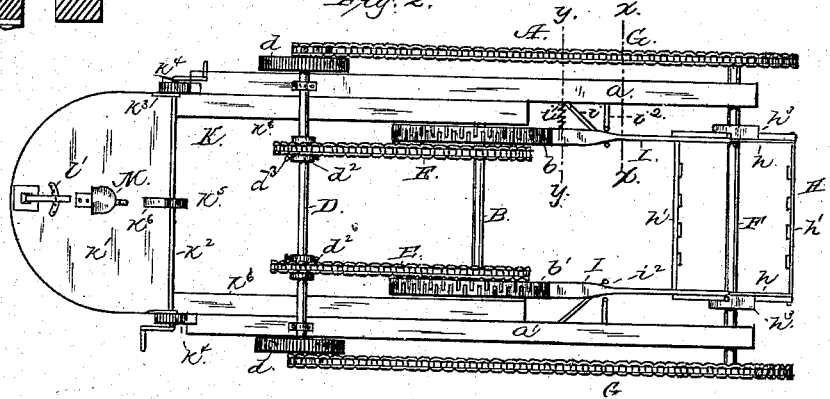
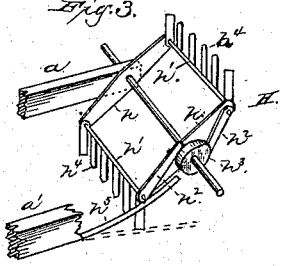
Witnesses:
J. E. Clark.
P. B. Turpin.
Inventor:
David F. Spangler,
per R. S. & A. P. Lacey
Attorneys

UNITED STATES PATENT OFFICE.

DAVID F. SPANGLER, OF SANTA ANA, CALIFORNIA.

SPADING-MACHINE.

SPECIFICATION forming part of Letters Patent No. 293,104, dated February 5, 1884.

Application filed September 30, 1882. (No model.)

*To all whom it may concern:*

Be it known that I, DAVID F. SPANGLER, a citizen of the United States, residing at Santa Ana, in the county of Los Angeles and State of California, have invented certain new and useful Improvements in Spading-Frames; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in spading-machines; and it has for its object to provide a machine which will be simple of construction and efficient in operation, and which will possess in itself the necessary mechanism for operation and locomotion, as will be described.

It consists, essentially, in the combination and arrangement of the several parts, and in the peculiar construction of the spading mechanism, hereinafter fully described, and specifically pointed out in the claims.

In the drawings, Figure 1 is a side view of a machine constructed according to my invention. Fig. 2 is a plan view with the horse-power removed. Fig. 3 is a detail view of the spading mechanism; and Figs. 4 and 5 are detached sectional views on, respectively, lines $xx$ and $yy$, Fig. 2, illustrating in detail the manner of pivoting and supporting the pallet hereinafter described.

A represents the main frame, composed of the side bars, $a\ a'$, and the intermediate shafts.

B represents the main axle journaled in the side bars, $a\ a'$, and having the wheels $b$ made fast thereto. These wheels are provided on their peripheries with teeth $b^2$, to prevent them slipping on the ground, and to be engaged by the lever-pawls hereinafter described.

$c$ represents sprocket-wheels made smaller than and fast to the inner side of the wheels $b\ b'$, and concentric therewith, as shown in Fig. 1. These wheels are provided with suitable teeth to be engaged by the chain, as shown.

D represents a shaft journaled in the side bars, $a\ a'$, about midway the axle B and the forward end of the frame A. It is extended beyond the side bars, $a\ a'$, and is provided on its ends with gear-wheels $d$ and sprocket-wheels $d'$, as shown. The wheels $d'$ are made smaller than the wheels $d$ for the purpose of increasing the power of the machine.

$d^2\ d^2$ represent sprocket-wheels arranged on the shaft D, directly in line with the wheels $c$, and provided with teeth corresponding with the teeth on wheels $c$. These wheels are placed loosely on the shaft D, and are made so that when desired they may be keyed to the shaft D, or may be sleeved loosely thereon, as is desired. In order to key these wheels to the shaft, I extend their hubs and provide them with a bolt-hole, through which is placed a pin or bolt, $d^3$, which passes through a coincident hole through the shaft D. It will be understood any other ordinary clutch mechanism could be employed in lieu of the one described.

E E represent band-chains passed around wheels $d^2$ and $c$, and conveying the motion of one to the other, as will be understood on reference to the drawings.

F represents a shaft journaled in the rear ends of the bars $a\ a'$, and forming a part of and supporting the spading-frames. It is provided on its opposite ends with sprocket-wheels F′ F′, which are connected, by band-chain G, with wheel $d'$, and receives its motion therefrom, as shown.

H represents the spading-frame, composed of the shaft F, the side bars, $h$, secured to the said shaft midway their ends, and the spade-carrying rods $h'$. The rods $h'$ are journaled in the opposite ends of the bars $h$, and they are provided on their ends with arms $h^2$, extended at right angles, as shown, and arranged to bear on an enlargement or round bearing-block, $h^3$, secured on the shaft, as will be described. This block is arranged between the bar $h$ and the bars $a\ a'$, and close to the bars $h$, as shown, so that the arms $h^2$ will bear thereon in the operation of the device.

$h^4$ represents the spades secured to and extending outwardly from the rod at a proper angle to the arm $h^2$, so that when the spades are in the position shown in Fig. 1 the arms $h^2$ will bear on top of the block $h^3$ and hold the series of spades firmly in position as they are being forced into the ground, and when they reach the position of the upper spades in Fig. 1, the spade-rod being journaled and the arm $h^2$ being now under the block, the spades tilt forward and throw the dirt elevated by them through the frame H, as will be seen on reference to the drawings. By preference I turn the end spades so that they will cut in a line parallel to the line of motion of the machine. The other spades cut at right angles thereto, as shown.

$h^5$ represents a spring-bar having one end secured on the under side of the beam $a'$ and its opposite end arranged to bear on the arms $h^2$ and hold the same in contact with the block $h^3$. Ordinarily the weight of the spades or rods $h'$ will bring them in proper position, with the arms $h^2$ bearing against block $h^3$; but I prefer to use the spring $h^5$, as I thus secure a positive action.

I represents the pallets by which the wheels $b\ b'$ are revolved in the operation of the device, as will be described. They are pivoted on the upper end of the rods $i$, the lower ends of which are pivoted on or alongside the bars $a\ a'$, and inclined outward and upward, as clearly shown in Fig. 5. The forward end of the pallets I bear on the wheels $b\ b'$, and are held in contact therewith by the springs $i'$, one end of which is secured to the pawl in front of its pivotal connection with rod $i$, and their opposite ends are secured to the side bars, $a\ a'$. The pawls are thus held always in contact with the wheels $b\ b'$, engaging the teeth $b^2$ of same, as shown. This spring also draws the pawl back to the position shown in Fig. 1 when it has been pushed forward, as will be described. The pawls I are supported in rear of their pivotal points by rods $i^2$, the upper ends of which are bifurcated and extend on either side of the pawls and support them, as shown. These bars may be secured to the bars $a\ a'$ and bent under the pawls, as shown in Fig. 4, or they may be supported on lugs extended from the said bars, as may be desired. The rear ends of the pawls extend back in position to be engaged by the bars $h\ h$ of the spading-frame, as the latter is revolved. Thus it will be seen as the spading-frame is revolved the pawls I are pushed forward twice with each revolution of the frame, causing the main wheels $b\ b'$ to revolve and propel the machine over the ground.

J represents an endless-belt horse-power supported on frame A. The rear end of the power is supported on the bars $a\ a'$, about in a level therewith, as shown, and its forward end is elevated on vertical standards $j$, which standards are secured to the forward ends of bars $a\ a'$, and the horse-power. The front side of the standards are formed with teeth for the purpose of adjustment, as will be described.

$j'$ represents gear-wheels secured on a shaft journaled in the horse-power, and arranged to receive motion from the revolving endless belt thereof. The wheel $j'$ meshes with the wheel $d$ and communicates the motion of the horse-power to the said wheel, as shown.

K represents a supplemental frame, the side bars, $k$, of which are journaled at the rear on axle B, and extend under shaft D, and its platform $k'$ is arranged in front of the frame A and horse-power J, as shown.

$k^2$ represents a shaft journaled in brackets $k^3$, supported on platform $k'$, as shown. This shaft is provided on its opposite ends with cranks.

$k^4$ represents gear-wheels keyed on shaft $k^2$, and arranged to mesh with the rack-bar formed on front of standards $j$, so as to move the said standards up or down, adjusting the tread-mill and frame A to any suitable angle desired.

$k^5$ represents a ratchet-wheel secured on shaft $k^2$, and arranged to be engaged by pawl $k^6$, whereby the shaft $k^2$ is prevented from turning when not so desired, and the several parts are held firmly in position.

L represents a caster-wheel supported under the platform $k'$.

$l$ represents a vertical rod secured to wheel L, and extended through the platform $k'$, and provided with a top plate, $l'$, formed with a series of holes, as shown.

$l^2$ represents a standard supported on platform $k'$, and having its upper end bent laterally over the plate $l'$, and provided with a bolt-hole, through which a bolt is passed through the coincident holes in plate $l'$, and secures the wheel in the direction in which it is desired to move the machine.

M represents the operator's seat, supported on platform $k'$ in rear of the rod $l$, as shown.

The operation of my invention will be readily understood on reference to the drawings. A horse or other suitable animal is placed in the tread-mill. The endless belt thereof gives motion to the shaft bearing the wheel $j'$. This wheel communicates motion to the wheel $d$, and thence to the various other parts of the machine, as may be desired. When spading, the wheels $d^2$ are left loose on the shaft D; but when it is desired to turn a corner or move the machine a short distance, the chains G may be unshipped and the wheels $d^2$ keyed to the shaft D, and by the connection with the wheels $c$, connected with the wheels $b\ b'$, the said wheels are revolved and the machine propelled over the ground.

By raising the tread-mill and frame A, and thus increasing the angle of the base of the mill, greater force is obtained, and the spading-frame may be placed at various angles to the ground.

It will be understood that, instead of the tread-mill hereinbefore described, an ordinary portable steam-engine could be mounted on the frame and properly geared with the several parts, so as to give the necessary motive power to the machine.

Having thus described my invention, whta I claim, and desire to secure by Letters Patent, is—

1. The spading-frame H, composed of the shaft F, the bearing-block $h^3$, secured on the shaft F, the side bars, $h\,h$, the spade-carrying rods $h'$, journaled in the ends of bars $h$, and the arms $h^2$, extended at right angles from the ends of rods $h'$, and having one end arranged to bear on the block $h^3$, the said frame being suitably journaled and adapted to be revolved, as set forth.

2. In a spading-machine, the combination, substantially as hereinbefore set forth, of the wheels $b\,b'$, the pallets I I, and spading-frame H, arranged and operating substantially as described, and means for revolving the frame H, as specified.

3. In a spading-machine, the combination of the wheels $b\,b'$, the revolving spading-frame H, the pallets I I, pivoted on a swinging support, means for revolving frame H, and springs $i'$, connecting the pallets at a point in advance of their pivots, with the framing, substantially as set forth.

4. In a spading-machine, the combination, substantially as set forth, of the frame A, having axle B and driving-wheels $b\,b'$, the spading-frame journaled in the rear end of the frame A, the operating mechanism mounted on said frames, suitable belts and pulleys gearing the operating mechanism with the drive-wheels and with the revolving spading-frame, and the pallets I I, all arranged and operating as and for the purposes specified.

In testimony whereof I affix my signature in presence of two witnesses.

DAVID F. SPANGLER.

Witnesses:
GEO. E. FREEMAN,
J. T. HORD.